United States Patent Office 3,489,136
Patented Jan. 13, 1970

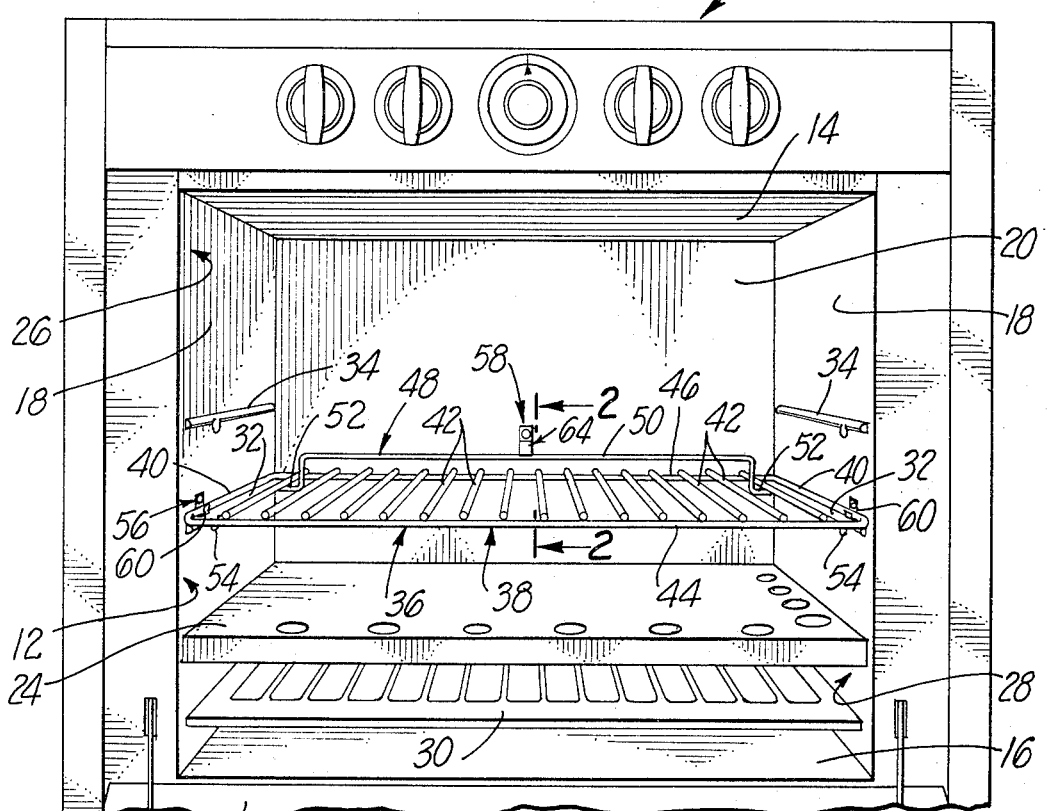

3,489,136
ANTIRATTLING SECURING MEANS FOR OVEN RACKS OR THE LIKE
John Bucellato, South Gate, Calif., assignor to Sattler Mfg. Corporation, Santa Fe Springs, Calif., a corporation of California
Filed Mar. 6, 1968, Ser. No. 711,008
Int. Cl. F24c *15/16*
U.S. Cl. 126—337     5 Claims

ABSTRACT OF THE DISCLOSURE

Devices for preventing rattling of oven racks, or the like, in campers, trailers, mobile homes, and the like, during transit. Spring hooks secure the sides of the rack adjacent the front thereof against rattling, while a spring clip engages the rear edge of the rack to maintain the rear portions of the side edges of the rack seated on their supports to prevent rattling.

BACKGROUND OF INVENTION

Mobile homes, house trailers, campers mounted on pickup trucks, and the like, are ordinarily provided with appliances, such as ovens, containing racks which tend to rattle in transit. Rattling of such racks can be very annoying, especially in campers, which may carry passengers in transit.

Racks in oven and similar compartments are ordinarily supported by seating the side edges thereof on suitable supports, such as ledges, integral with the side walls of the compartments. Consequently, the racks are free to bounce up and down, and to slide sideways, or forwardly and rearwardly, in response to the usual motions experienced by vehicles of the type mentioned when moving. Such movements of the racks relative to their compartments can produce very annoying rattles.

SUMMARY AND OBJECTS OF INVENTION

A primary object of the invention is to provide means for securing an oven rack, or the like, in place, relative to its compartment, in such a manner as to prevent rattling.

An important object is to provide means for securing a rack against rattling which requires only a few simple and inexpensive parts, and which requires no modification of the rack and virtually no modification of the compartment.

Another object is to provide a first securing means engageable with the side edges of the rack adjacent the front edge thereof for substantially preventing movement of the front portion of the rack relative to the compartment, and a second securing means engageable with the rack for maintaining the rear portions of the side edges of the rack seated on their supports so as to substantially prevent movement of the rear portion of the rack relative to the compartment.

A further object is to provide a structure of the foregoing nature wherein the first securing means comprises upwardly facing spring hooks respectively mounted on the side walls of the compartment and respectively receiving therein rods forming the side edges of the rack.

Still another object is to provide a construction wherein the second securing means includes a spring clip which is mounted on the rear wall of the compartment and under which the rear edge of the rack is insertable so that the spring clip biases the rear edge of the rack downwardly to maintain the rear portions of the side edges thereof seated on their supports.

Thus, the present invention provides a very simple and inexpensive means of preventing rattling of the rack, only two simple spring hooks and a simple spring clip being required. These can be installed with no modifications whatsoever of the rack, and with only a screw hole, or the like, in each of the side walls and in the rear wall.

The foregoing objects, advantages, features and results of the present invention, together with various other objects, advantages, features and results which will be evident to those skilled in the art in the light of this disclosure, may be achieved with the exemplary embodiment of the invention illustrated in the accompanying drawing and described in detail hereinafter.

DESCRIPTION OF DRAWING

In the drawing:
FIG. 1 is a front perspective view of a gas oven, with its door open, showing the invention installed therein;
FIG. 2 is an enlarged longitudinal sectional view through the oven which is taken as indicated by the arrowed line 2—2 of FIG. 1;
FIG. 3 is an enlarged perspective view of a spring hook forming part of the antirattling securing means of the invention; and
FIG. 4 is an enlarged perspective view of a spring clip forming part of the antirattling securing means.

DETAILED DESCRIPTION OF PREFERRED EMBODIMENT OF INVENTION

Referring initially to FIG. 1 of the drawing, illustrated generally therein is a gas-fired oven 10 provided therein with a compartment 12 defined by top and bottom walls 14 and 16, side walls 18 and a rear wall 20. The oven 10 also includes a door, shown fragmentarily at 22 in its open position, for closing the front of the compartment 12.

In the particular construction illustrated, the compartment 12 is divided by a horizontal partition 24 into an upper, oven or baking compartment 26 and a lower, broiler compartment 28. The latter contains a broiler pan 30 spaced downwardly from the partition 24. A gas burner, not visible, is located between the broiler pan 30 and the partition 24.

The side walls 18 of the compartment 26 are shown as provided with two vertically spaced sets of supports 32 and 34 for a rack 36. The two sets of supports are identical so that only the lower supports 32 will be considered.

The supports 32 are preferably ledges formed integrally with the respective side walls 18. They project laterally into the compartment 26 and extend longitudinally, i.e., in the fore-and-aft direction, substantially from the front of the compartment 26 to the rear wall 20 thereof.

The rack 36 is of conventional construction and comprises a square or rectangular rod or wire frame 38 having side rods 40 which form the side edges thereof and which respectively rest on the lower supports 32 (or the upper supports 34). The rack 36 also includes laterally spaced, longitudinally extending wires or rods 42 welded to front and rear rods 44 and 46 which, together with the side rods 40, form integral parts of the frame 38.

The rack 36 also includes at the rear thereof another, laterally extending rod 48 having an elevated central portion 50 which serves to keep articles on the rack from sliding off the rear edge thereof when the rack is pulled forwardly. As is conventional, the laterally extending rod 48 terminates at its ends in portions 52 which project laterally outwardly below the supports 32. When the rack 36 is pulled forwardly, the end portions 52 of the laterally extending rod 48 are adapted to engage laterally-inwardly-extending projections 54 formed integrally with the side walls 18 below the supports 32. Thus, the rod end portions 52 and the projections 54 serve to prevent inadvertent complete withdrawal of the rack 36 from the compartment 26. If complete withdrawal is desired, this may be accomplished by lifting upwardly on the front edge of the rack 36, then pushing the rack rearwardly and lifting it upwardly until the rod end portions 52 are disposed above the supports 32, and then pulling the rack 36 forwardly out of the compartment 26.

The foregoing construction of the oven 10 is largely conventional and has been described in some detail to set forth the environment of the means of the invention for preventing rattling of the rack 36 in transit.

Considering the antirattling securing means of the invention, it comprises first securing means 56 engageable with the side edges of the rack 36 adjacent the front edge thereof for substantially preventing movement of the front portion of the rack relative to the supports 32, and includes second securing means 58 engageable with the rack for maintaining the rearmost portions of the side edges of the rack seated on the supports 32 so as to substantially prevent movement of the rear portion of the rack relative to such supports.

The first securing means 56 comprises simply two upwardly-facing spring hooks 60 respectively mounted on the side walls 18 of the compartment 26 adjacent the front thereof and respectively adapted to receive therein the front end portions of the side rods 40. The two hooks 60 are secured, as by bolts 62, in positions such that they hold the front portions of the side rods 40 just above the corresponding portions of the supports 32. Preferably, the spring hooks 60 are so shaped that the front end portions of the side rods 40 can be snapped thereinto, the terminal ends of the hook portions of the hooks 60 turning laterally outwardly slightly, relative to the compartment 26, to achieve this.

The second securing means 58 is engageable with the elevated central portion 50 of the laterally extending rod 48 at the rear of the rack 36, and serves to maintain the rear portions of the side rods 40 seated against the rear portions of the supports 32. More particularly, the second securing means 58 comprises simply a centrally-located spring clip 64 which is secured to the rear wall 20 of the compartment 26, as by a bolt 66, and under which the elevated central portion 50 of the laterally extending rod 48 is insertable, preferably with a snap action. To achieve this, the spring clip 64 is provided with a downwardly and forwardly sloping arm 68 which terminates at its lower end in a tab 70 that extends rearwardly and slopes upwardly slightly.

As will be apparent, when the rack 36 is slid rearwardly, relative to the spring hooks 60 and the supports 32, the elevated central portion 50 of the laterally extending rod 48 snaps under the tab 70, and is pressed downwardly thereby to maintain the side edges of the rack 36 in engagement with the rear portions of the supports 32. The resilience of the spring clip 64, and the inherent resilience of the rod 48, serve to maintain the tab 70 in engagement with the elevated central portion 50.

The two spring hooks 60 and the spring clip 64 secure the rack 36 in place in a positive manner to prevent rattling thereof in response to vibration, travel over bumpy surfaces, and the like. It will be apparent that the antirattling securing means of the invention can be installed in the oven 10 with no modifications of the rack 36 whatsoever. The only modifications of the oven 10 which are required to install the spring hooks 60 and the spring hook 64 comprise the drilling of three holes for the bolts 62 and the bolt 66. Thus, the present invention provides a very simple antirattling means which can be installed readily with a minimum of equipment.

Although an exemplary embodiment of the invention has been described herein for purposes of illustration, it will be understood that various changes, modifications and substitutions may be incorporated in such embodiment without departing from the spirit of the invention as defined in the claims.

I claim as my invention:

1. In combination with an oven, or the like, comprising a compartment having side walls respectively provided with fore-and-aft-extending supports on which side edges of a rack are seatable, and along which said rack is slidable in the fore-and-aft direction into and out of a rearmost position, and provided with a rear wall adjacent which a rear edge of said rack is positionable in said rearmost position of said rack, means for securing said rack to said walls against rattling, while permitting fore-and-aft sliding movement of said rack into and out of said rearmost position, including:
    (a) first spring securing means resiliently engageable with said side edges of said rack adjacent a front edge thereof for preventing lateral and vertical rattling movement of a front portion of said rack relative to said supports while permitting fore-and-aft sliding movement of said rack relative thereto; and
    (b) second spring securing means resiliently engageable with said rear edge of said rack in said rearmost position thereof for biasing rear portions of said side edges of said rack downwardly against said supports so as to prevent vertical rattling movement of a rear portion of said rack relative to said supports while permitting fore-and-aft sliding movement of said rack relative thereto.

2. A combination as set forth in claim 1 wherein said side edges of said rack respectively comprise side rods and wherein said first securing means comprises upwardly facing spring hooks respectively mounted on said side walls and receiving said side rods therein.

3. A combination according to claim 1 wherein said second securing means includes spring means mounted on said rear wall and engaging said rear edge of said rack for biasing said rear edge of said rack downwardly so as to maintain said rear portions of said side edges thereof seated on said supports.

4. A combination as defined in claim 3 wherein said spring means comprises a spring clip under which said rear edge of said rack is insertable.

5. A combination as set forth in claim 4 wherein said side edges of said rack respectively comprise side rods and wherein said first securing means comprises upwardly facing spring hooks respectively mounted on said side walls and receiving said side rods therein.

References Cited

UNITED STATES PATENTS

| 1,918,457 | 7/1933 | Dowell | 248—250 |
| 3,186,364 | 6/1965 | Castantini et al. | 248—250 |
| 2,090,353 | 8/1937 | Hokanson | 126—337 |

EDWARD G. FAVORS, Primary Examiner

U.S. Cl. X.R.

248—250